Patented Oct. 7, 1947

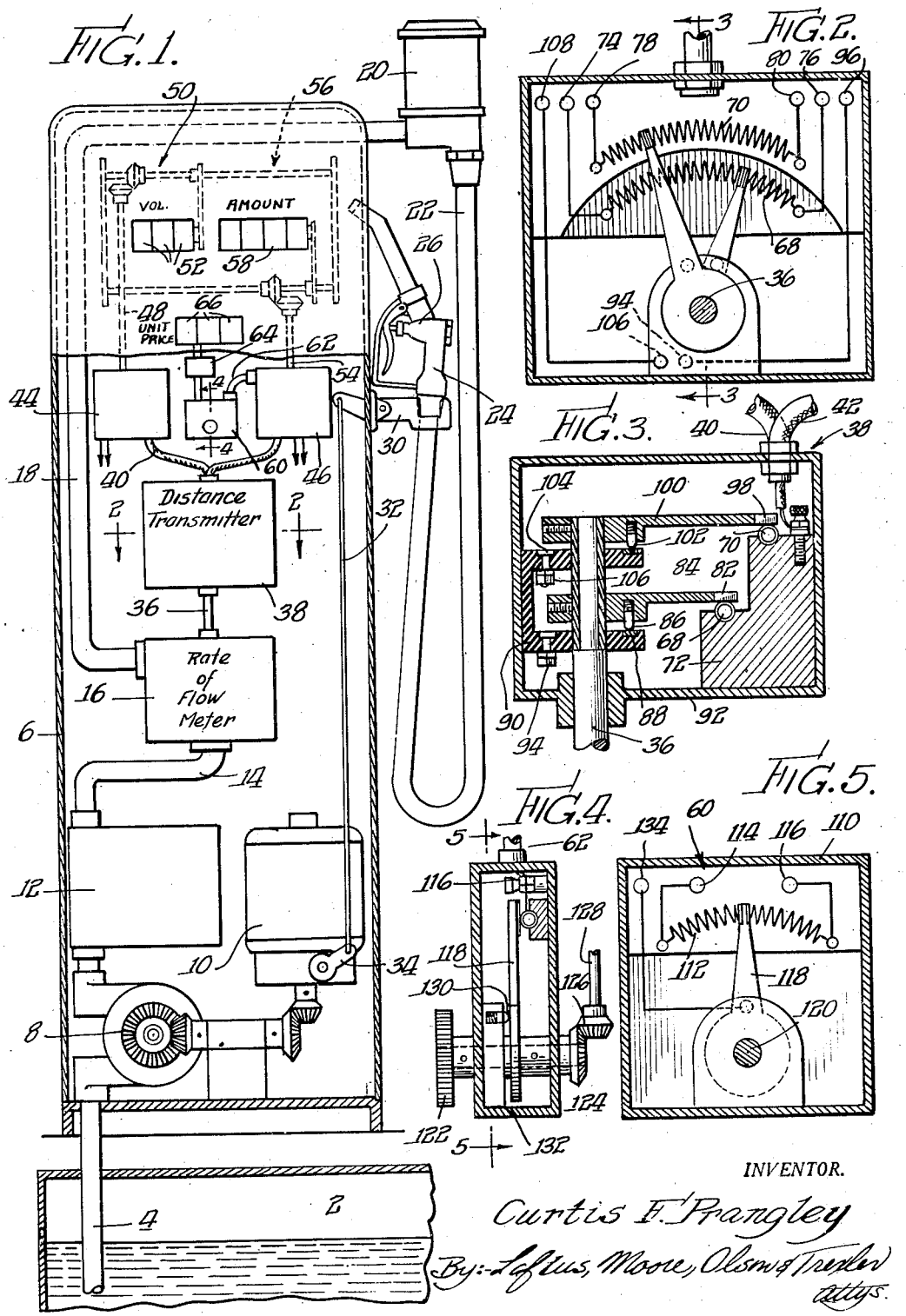

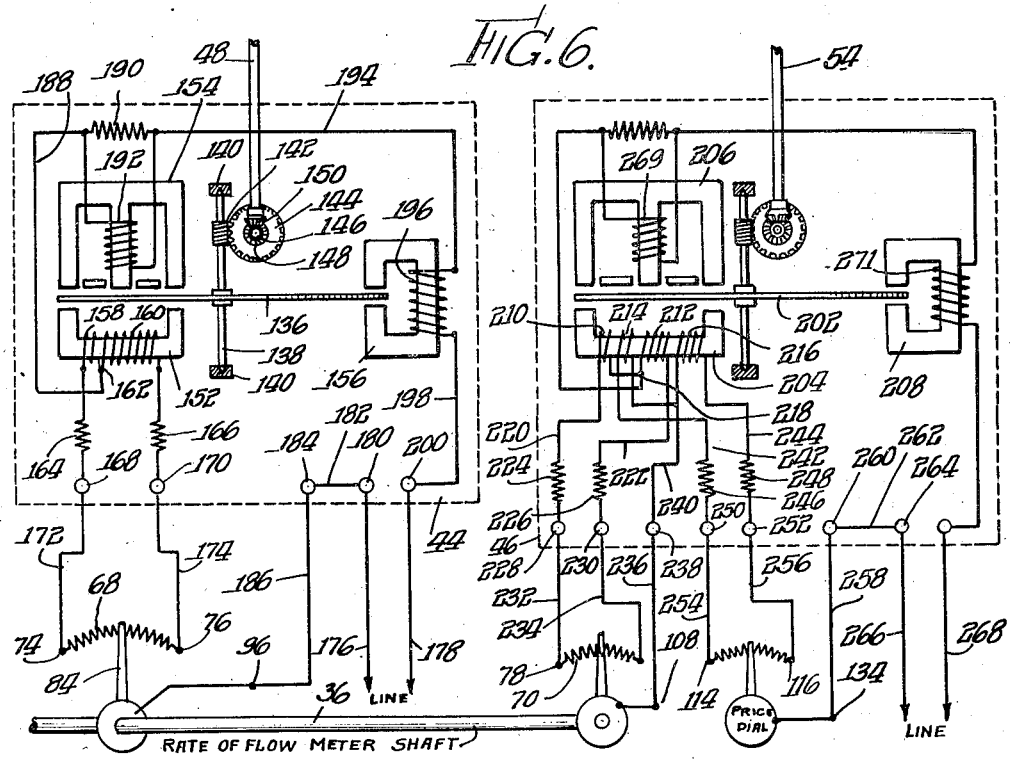
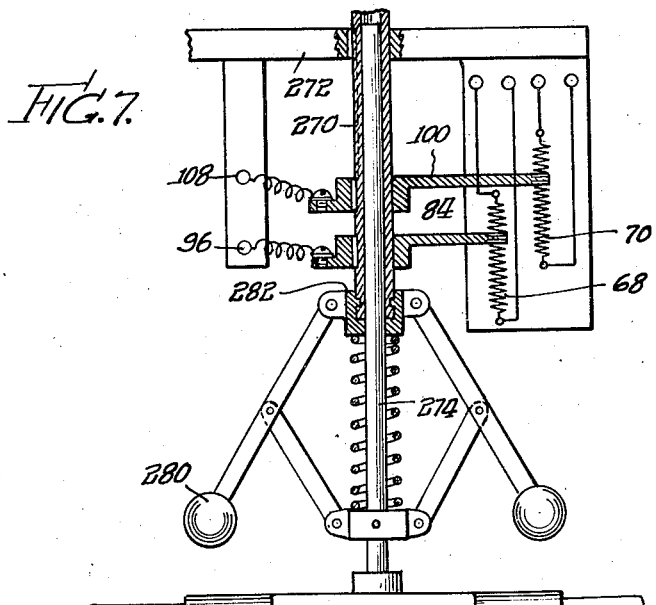

2,428,382

UNITED STATES PATENT OFFICE 2,428,382

LIQUID DISPENSING APPARATUS

Curtis F. Prangley, Evanston, Ill.

Application October 11, 1943, Serial No. 505,753

8 Claims. (Cl. 222—26)

This invention relates to dispensing devices, and more particularly to devices for dispensing fuels for internal combustion engines and the like.

Among the objects of the present invention are to provide a liquid dispensing apparatus including electrical integrating or computing means for indicating the volume and cost of the liquid dispensed; to provide a dispensing device of the computing pump type which is simple in cost of construction and assembly, efficient in operation, and which may be easily adjusted to effect any necessary price change; more particularly it is an object of the invention to provide electrically operable computing means automatically synchronized with the flow of liquid being dispensed; to provide electrically operable computer mechanism in a gasoline dispensing system which shall be accurate and unaffected by variations in voltage and frequency of the supply source, and to provide electrically operable computer mechanism in a gasoline dispensing device in which the operation of the volume and cost registers shall be related to the rate of flow of the liquid being dispensed and the operation of the registers shall be controlled by the rate of flow of the fluid; to provide a gasoline pump of the computer type wherein electrical means is provided and such means may be operated without mechanical connection whatsoever to the liquid forcing and regulating elements and which may be located in any desired position or relation, either remote or adjacent said elements, for instance, the electrically operated volume and cost registering mechanism may be placed remotely from the pump itself and operated as efficiently as if they were placed directly on the same structure with the pump itself, and in addition a number of such registering mechanisms electrically operated and remotely placed from the pump itself can be utilized.

A more specific object of the invention is to provide electrically operable voltage and frequency compensating motors or timers, the operation of which is controlled in accordance with the rate of flow of fluid in the dispensing line and which in turn operate volume and cost registers indicating the volume and cost of the fluid dispensed; to provide these and other objects of invention as will be apparent from the following specification when taken in connection with the accompanying drawings, wherein:

Figure 1 is a side view of one form of my present invention.

Figure 2 is a section taken on the line 2—2 of Figure 1.

Figure 3 is a section taken on the line 3—3 of Figure 2.

Figure 4 is a section taken on the line 4—4 of Figure 1.

Figure 5 is a section taken on the line 5—5 of Figure 4.

Figure 6 is a schematic diagram of the electric circuits of the induction meter motors and their connections to the distance transmitters.

Figure 7 is a diagrammatic representation of a modified form of control for the distance transmitter.

Referring now to the drawings in detail, there is shown the usual type of gasoline reservoir, preferably an underground tank 2, and a liquid dispensing line leading therefrom comprising the pipe 4 which has at its lower end the usual type of foot valve. There is also shown an upright housing 6 which may be of any desired type for containing the pumping mechanism. A flow line is shown as including any type of liquid pump 8 driven from the electric motor 10 by appropriate gearing. This pump discharges into the usual type of air eliminating device 12 disposed in the casing 6 from which the dispensing line passes by means of the pipe 14 to a flow meter or other means responsive to the rate of flow of fluid through the dispensing line, and thence by means of a dispensing line pipe 18 to the usual type of sight glass 20 which discharges into a flexible hose 22 provided with a terminal nozzle 24 having the usual type of manually actuated control valve 26 for controlling the dispensing through the flow line when the pump 8 is discharging liquid through the dispensing line. Pump 8 is provided preferably with the usual type of by-pass mechanism, well known in the art. The nozzle 24 is located upon the usual type of nozzle hook 30, the operation of which is transmitted by means of rod 32 to a switch lever 38 for starting and stopping the motor as is well known in the art.

The flow meter 16 is variably operated in response to the rate of flow of the liquid flowing through the dispensing line. The flow meter is provided with a shaft 36 which extends into a distance transmitter 38 connected by control cables 40 and 42 to induction meter motors 44 and 46, compensated for voltage and frequency variations in the electrical supply line. The induction meter motor 44, through a shaft 48, drives the usual volume register indicated diagrammatically at 50 and having the volume indicating dials or wheels 52. The induction meter motor 46, through a shaft 54, drives the usual cost register, indicated diagrammatically at 56, and having the usual cost indicating dials 58. The registers 50 and 56 may be of any usual type known in the art, and having the conventional resetting mechanism by means of which the dials are returned to their zero positions. A price variator 60 is mounted in any convenient position in the housing 6 and is electrically connected as by cable 62 to the induction meter motor 46 which drives the cost register and is mechanically connected through a suitable gear mechanism 64 to the usual unit price indicator 66.

As shown in Figures 2 and 3, the distance transmitter 38 into which extends the shaft 36 of the rate of flow meter 16 may comprise a pair of resistors, rheostats, or potentiometers 68 and 70 in an insulating, supporting and terminal block 72. The resistors 68 and 70 are connected at their ends to terminals 74, 76, 78 and 80. The resistor 68 is traversed by a brush 82 supported at the outer end of a lever 84 secured to, but insulated from, the shaft 36. The lever 84 carries a spring pressed contact pin 86 engaging a slip ring 88 mounted in an insulating bracket 90 secured to the wall of the explosion-proof housing 92 of the distance transmitter. The slip ring 88 is provided with a terminal 94 which, as shown in Figure 2, is connected to the terminal 96 mounted with the terminals 74, 76, 78 and 80 on the combined supporting and terminal blocks 70 and 72. The resistor 70 is traversed by a brush 98 carried at the outer end of a lever 100 secured to but insulated from the shaft 36. The lever 100 carries a spring pressed contact pin 102 engaging a slip ring 104 mounted also on the bracket 90 and having a terminal 106 connected, as shown in Figure 2, to the terminal 108 of the set carried by the block 72. It will be evident, of course, that the angular positions of the brushes 82 and 98 will be determined by the degree of angular rotation of the shaft 36, which in turn will be determined by the rate of flow measured by the meter 16. Hence the ratio of resistance between the terminals 74 and 76 and the terminal 96 will be determined by the rate of flow of fluid through the dispensing line and the ratio of resistance between the terminals 78 and 80 and 108 will also be determined by the rate of flow of fluid through the dispensing line.

The price variator 60, as shown in Figures 4 and 5, comprises an explosion-proof housing 110 in which is mounted a resistor, rheostat or potentiometer 112 having its opposite ends connected to terminals 114 and 116 and a wiper arm 118 connected to a manually adjustable shaft 120 projecting through the forward wall of the housing, and provided with an operating knob 122. The shaft 120 also extends through the opposite wall of the housing 110 and carries a gear 124 meshing with the gear 126 carried by vertical shaft 128 which extends into the gear box 64 that drives the price per unit indicator 66. The wiper arm 118 is secured to, but insulated from, the shaft 120 and its annular hub portion engages a spring pressed contact pin 130 mounted in a terminal block 132, the contact pin 130 being connected to the terminal 134, the terminals 114, 116 and 134 being mounted in any appropriate manner in the housing 110 and connected to the ends of the three-wire cable 62 which extends from the price variator 60 to the induction meter motor 46. The distance transmitter 38 is coupled by the three-wire cable 40 to the induction meter motor 44 and by the three-wire cable 42 to the induction meter motor 46.

As shown in Figure 6, the induction meter motor 44 comprises the usual conductive disc 136, preferably of aluminum, secured to a spindle 138 journalled in suitable end bearings 140 and provided with a worm or other gear 142 meshing with a worm wheel or other gear 144 on a suitably mounted shaft 146 carrying a second gear 148 meshing with a gear 150 on the bottom of shaft 48 by means of which the cost register 50 is driven. The disc 136 is driven by magnets 152 and 154 and braked by magnet 156. The magnet 152 is provided with differentially acting coils 158 and 160 connected at their inner ends as at 162 and connected at their free ends through balncing calibrating resistors 164 and 166 to terminals 168 and 170 connected by wires 172 and 174—which form two wires of the three-wire cable 40, to the distance transmitter, specifically the terminals 74 and 76 of said distance transmitter. The supply lines 176 and 178 which are connected to the alternating current line, i. e. the same supply line which is connected to the motor 10, or to the supply line through a suitable transformer, not shown. The wire 176 leading from the supply line is connected to a terminal 180 which in turn is connected by wire 182 to terminal 184, the terminal 184 being connected by the third wire 186 of the cable 40 to the terminal 96 of the distance transmitter. The common terminal 162 of the differentially acting coils 158 and 160 of the electro-magnet 152 is connected by wire 188 to a resistor 190 across which the coil 192 of the electro-magnet 154 is connected. The coil 192 constitutes the potential coil for the induction meter motor while the differentially acting coils 158 and 160 acting together constitute the series or current coil for the induction meter motor. A wire 194 extends from the other side of the resistor 190 to the coil 196 of the braking electro-magnet 156, the other side of this coil 196 being connected by wire 198 to the terminal 200 to which the other wire 178 leading from the supply line is connected. It can be mathematically proven that the speed of the disc 136 by proper proportioning of the several coils of the induction meter motor and by proper calibration through the balancing resistance, will remain dependent solely upon the ratio of the resistance between the terminal 74 and the arm 84 to the resistance between the terminal 76 and the arm 84. Hence the speed of the disc 136 will at every instant be proportioned to the instantaneous rate of flow of liquid through the dispensing line.

Again, by proper proportioning of the coils of the induction meter motor, the speed of the disc can be made independent of changes in the voltage and frequency of the supply line. As the voltage or frequency changes, the driving torque applied to the disc by the magnets 152 and 154 varies, but at the same time the braking force or torque exerted by the magnet 156 varies in a compensating sense, so that for all practical purposes the speed of the disc is independent of voltage and frequency and is determined solely by the position of the lever 84 of the distance transmitter.

The induction meter motor 46 is generally similar to the induction meter motor 44 but the speed thereof must also be governed by the price variator 60 in accordance with the price per unit volume of liquid dispensed. This induction meter motor 46 comprises a conductive rotatable disc 202 similar in every respect to the disc 36, similarly mounted and similarly connected mechanically to the shaft 54 by which the cost register is driven. The disc 202 is driven by electro-magnet 204 and electro-magnet 206, and is braked by an electro-magnet 208. The electro-magnet 204 is in this instance provided with two sets of differentially acting coils, one set comprising a coil 210 and a coil 212, and the other set comprising a coil 214 and a coil 216, each set being similar to the coils 158 and 160. The coils 210 and 212 are interconnected at their adjacent ends as at 218, while at their opposite ends they are connected by wire 220 and wire 222 through calibrating and balancing resistors 224 and 226 to terminals 228 and 230. The terminals 228 and 230 are connected by the wires 232 and 234 of the cable 42 to the distance transmitter, and specifically to terminals 78 and 80 of said transmitter. The third wire 236 of the three-wire cable 42 which is connected to the terminal 108 of the distance transmitter is connected to terminal 238 of the induction meter motor 46 which terminal is connected by wire 240 in common to the adjacent ends of the coils 214 and 216. The opposite ends of the coils 214 and 216 are connected by wires 242 and 244 through balancing and calibrating resistors 246 and 248 to terminals 250 and 252. The terminals 250 and 252 are connected by wires 254 and 256 of the three-wire cable 62 to the price variator 60, specifically to the opposite terminals 114 and 116 of the price variator. The terminal 134 of the price variator is connected by wire 258 to the terminal 260 of the induction meter motor, which terminal is directly connected by wire 262 to terminal 264 to which a wire 266 leads from the supply line. A wire 268 leads from the other side of the supply line—the same supply line to which the wires 176 and 178 are connected, and preferably also the same line to which the electric motor 10 is connected, although for protection of the induction meter motor it may be desirable to interpose a transformer to the secondary of which the supply lines 176—266 and 178—268 are connected in parallel. The potential and braking coils 269 and 271 are connected in the same manner as the coils 192 and 196 of the motor 44. The induction meter motor 46 operates similarly to the induction meter motor 44 but integrates, in effect, the rate of flow of the liquid with the adjusted price per unit volume of the liquid dispensed.

As shown in Figure 7, the present type of displacement meter, commonly employed in a liquid dispensing apparatus, may be utilized to control the levers 84 and 100 which carry the brushes that engage the resistors or rheostats 68 and 70, these rheostats forming the distance transmitter and being connected to the induction meter motor in the same manner as disclosed with reference to Figures 1 to 6. In this case the levers 84 and 100 are secured to a slidable sleeve 270 held against rotation by having a slidable spline connection to a fixed yoke 272. The sleeve 270 is raised and lowered in accordance with the speed at which the shaft 274 of the displacement meter 276 is driven, by means of a governor or speed responsive device 278 of known construction, embodying swingable fly balls 280 secured to slidable and rotatable yoke 282 journalled on the sleeve 270 but having an annular key connection thereto to cause the sleeve to move vertically. A calibrated spring 284 regulates the movement of the fly balls in the conventional manner.

The distance transmitter itself controls the starting and stopping of the induction meter motor, for in the zero position of the levers 84 and 100, i. e., the positions which they assume when the dispensing system is not operating, the resistance included in the circuits of the differentially arranged current coils of each induction meter are such as to ensure stoppage of the driven discs. Of course, as previously stated, the supply lines leading to the induction meter motors and from them to the distance transmitter, are connected to the supply cable through switch contacts which may be incorporated in the control switch for the motor 10 and which switch is operated on the removal and replacement of the nozzle on the supporting hook 30.

Obviously the invention is not limited to the specific details of construction disclosed herein but is capable of other modifications and changes without departing from the spirit and scope of the appended claims.

Having thus described my invention, what I claim as new and desire to secure by Letters Patent is:

1. In a liquid dispensing device, in combination with a flow line, means responsive to the rate of flow of fluid through the dispensing line, a volume register and a cost register, electrically operable motor means operating said registers and controlled as to speed by said flow responsive means, and price adjustable means for adjustably varying the speed of the motor means operating the cost register in accordance with the price per unit of liquid dispensed.

2. In a liquid dispensing device, a dispensing line, a valve in said line for opening and closing said line to the flow of liquid therethrough, means in said line for forcing liquid therethrough when the valve is open at a variable rate of flow dependent upon the extent of opening of said valve, a volume register, a cost register, voltage and frequency compensated electrical motor means, one for operating each of said registers, and electrical price variator means for adjustably varying the speed of operation of the motor means operating the cost register in accordance with price per unit volume of liquid dispensed.

3. In liquid dispensing apparatus, the combination of a flow line, a volume register, a cost register, means responsive to the rate of flow of fluid through said line for driving said volume register, electrically operable motor means for driving said cost register, means responsive to the rate of flow of fluid through said line for controlling the instantaneous speed of driving of said cost register by said electrically operable means, and price variator means for governing the average rate of driving of said cost register by said electrically operable motor means in accordance with the unit cost of said liquid per unit of measure.

4. A liquid flow apparatus comprising a dispensing line through which liquid flows at variable rates, a meter connected with the flow line and responsive to the liquid flow therethrough, register mechanism, an electric motor for driving the register mechanism, motor energizing power supply means independent of the meter for supplying power to the motor, and means controlled by the meter for controlling the speed of operation of the register driving motor.

5. A liquid dispensing apparatus comprising a flow line through which liquid flows at variable rates, register mechanism, a first prime mover for driving said liquid propelling means, a second, independent, prime mover for driving the register mechanism, and means responsive to the rate of flow of liquid through the dispensing line for controlling the speed of operation of the register driving prime mover.

6. A liquid dispensing apparatus comprising a flow line, means for controlling the rate of flow of liquid through said line, means for propelling liquid through the line at variable rates of flow determined by said controlling means, means for driving the pump, register mechanism, an electric motor independent of said pump driving means for driving the register mechanism, and means responsive to the flow of liquid through the dispensing line for controlling the speed of operation of said electric motor.

7. A liquid dispensing apparatus comprising a flow line, means for controlling the rate of flow of liquid through said line, means for propelling liquid through the line at variable rates of flow determined by said controlling means, means for driving the pump, cost register mechanism, an electric motor independent of said pump driving means for driving the register mechanism, means responsive to the flow of liquid through the line for controlling the speed of operation of said electric motor, and price adjustable means for adjusting the speed controlling relationship of the flow responsive means and the electric motor in accordance with the price per unit volume of liquid dispensed.

8. In a liquid dispensing apparatus, the combination of a flow line, a meter in said line, a mechanical cost register, an induction-meter motor for driving said cost register, an adjustably, preset electrically operable control means connected to said motor for regulating the base speed of operation of said induction-meter motor in accordance with the price per unit volume of liquid dispensed, and a second, electrically operable control means operatively connected to said motor and said first control means and mechanically connected to said meter for response to the flow of liquid through said line for varying the instantaneous speed of operation of said induction-meter motor about said base speed in accordance with variations in the instantaneous rate of flow of liquid through said line.

CURTIS F. PRANGLEY.

REFERENCES CITED

The following references are of record in the file of this patent:

UNITED STATES PATENTS

| Number | Name | Date |
|---|---|---|
| 2,209,700 | Mayo | July 10, 1940 |
| 2,151,239 | Slye | Mar. 21, 1939 |

FOREIGN PATENTS

| Number | Country | Date |
|---|---|---|
| 738,445 | France | Oct. 17, 1932 |